March 31, 1936. J. L. TAYLOR 2,035,576
DYNAMOMETER
Filed Aug. 12, 1932 2 Sheets-Sheet 1
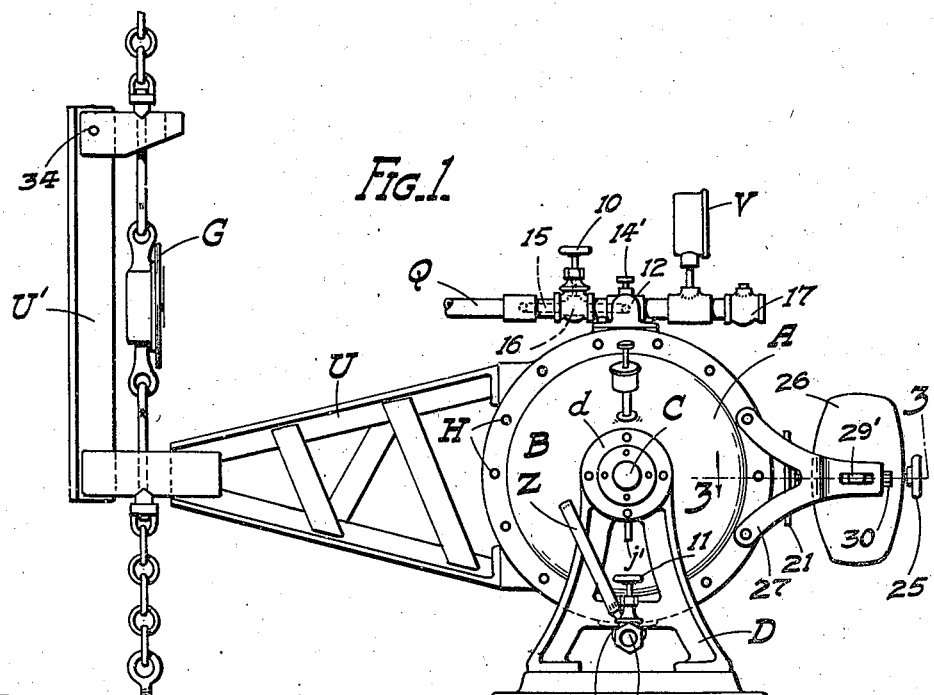
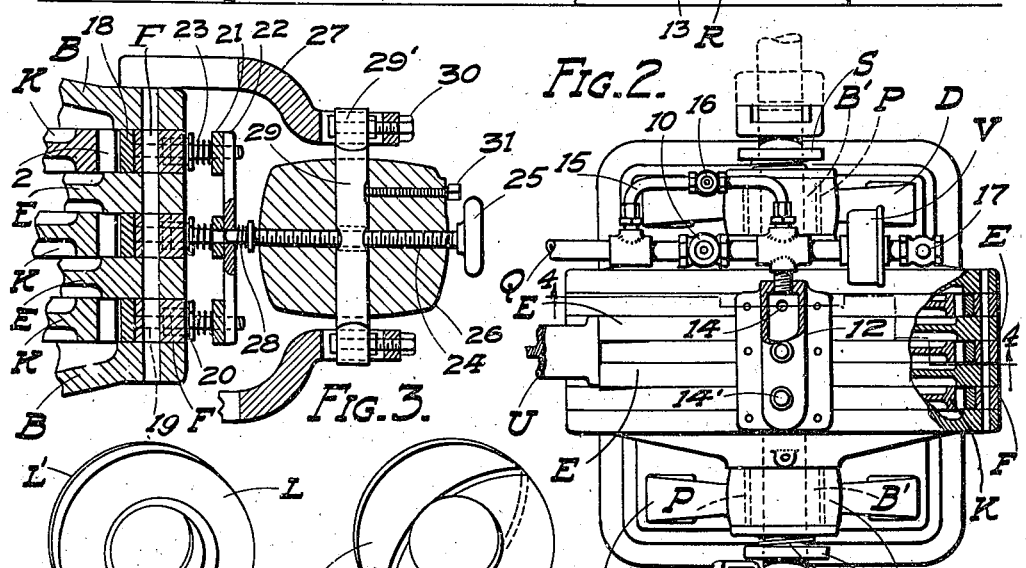
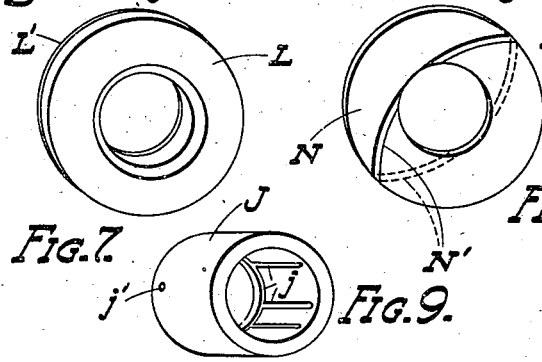
INVENTOR:
John Leonard Taylor.
BY:
ATTORNEY.

March 31, 1936. J. L. TAYLOR 2,035,576
DYNAMOMETER
Filed Aug. 12, 1932 2 Sheets-Sheet 2

INVENTOR:
John Leonard Taylor.
BY:
ATTORNEY.

Patented Mar. 31, 1936

2,035,576

UNITED STATES PATENT OFFICE 2,035,576

DYNAMOMETER

John Leonard Taylor, Milwaukee, Wis.

Original application October 24, 1931, Serial No. 570,943, now Patent No. 1,991,826. Divided and this application August 12, 1932, Serial No. 628,491

29 Claims. (Cl. 188—90)

This invention relates to dynamometers, and more particularly to those in which energy is absorbed and torque measured by means of a fluid brake, and an object of the invention is to generally improve the construction and operation of such mechanism, and to broaden the field of usefulness thereof.

More particularly, an object of the invention is to provide a fluid brake construction capable of resisting rotation in either direction with substantially equal efficiency.

A further object is to provide such a structure which can be extremely closely regulated, and further objects are to provide the following:

Such a structure having a plurality of rotors in separate chambers, and means for permitting flow selectively into the individual chambers;

Such a structure which provides for a relatively large capacity;

Such a structure in which the forms of the rotor and stator are such as to cause a transfer of masses of fluid alternately from the one to the other during operation of the device;

Such a structure in which the fluid engaging elements comprise pockets or openings characterized by curved surfaces adapted to so direct the fluid;

A form for such pockets or openings which will cause a relatively smooth transfer of fluid and minimize emulsification of fluid;

An arrangement of stator and rotor elements arranged to operate together without substantial clearance, and in which the flow of fluid in the device is necessarily substantially entirely within the openings of the elements;

Such a structure in which paths are provided for inward movement of fluid displaced from the stator openings by fluid from the rotor openings, said paths being arranged to direct the displaced fluid back into the rotor openings;

Such a structure in which the resistance will be smooth and continuous;

An arrangement of the fluid pockets suitable to provide this result;

Such a structure in which high torque may be developed at low speeds;

A combination fluid and friction brake for this purpose;

Means for cooling the friction brake;

Various details of construction for increasing the efficiency of the apparatus; and other objects and advantages which will appear as the specification proceeds.

Fig. 1 is a front elevation of the invention adapted to be employed as a dynamometer assembly.

Fig. 2 is an enlarged top plan, broken away to disclose interior aspects.

Fig. 3 is a sectional view taken on line 3—3 of Fig. 1.

Fig. 7 is a perspective view of spacing collars employed herein.

Fig. 8 is a perspective view of a thrust washer.

Fig. 9 is a perspective view of a shaft bushing.

Fig. 12 is a perspective view of an element employed in the structure of Fig. 11.

Similar reference characters apply to like parts in all the figures aforesaid.

Figures 4, 5:
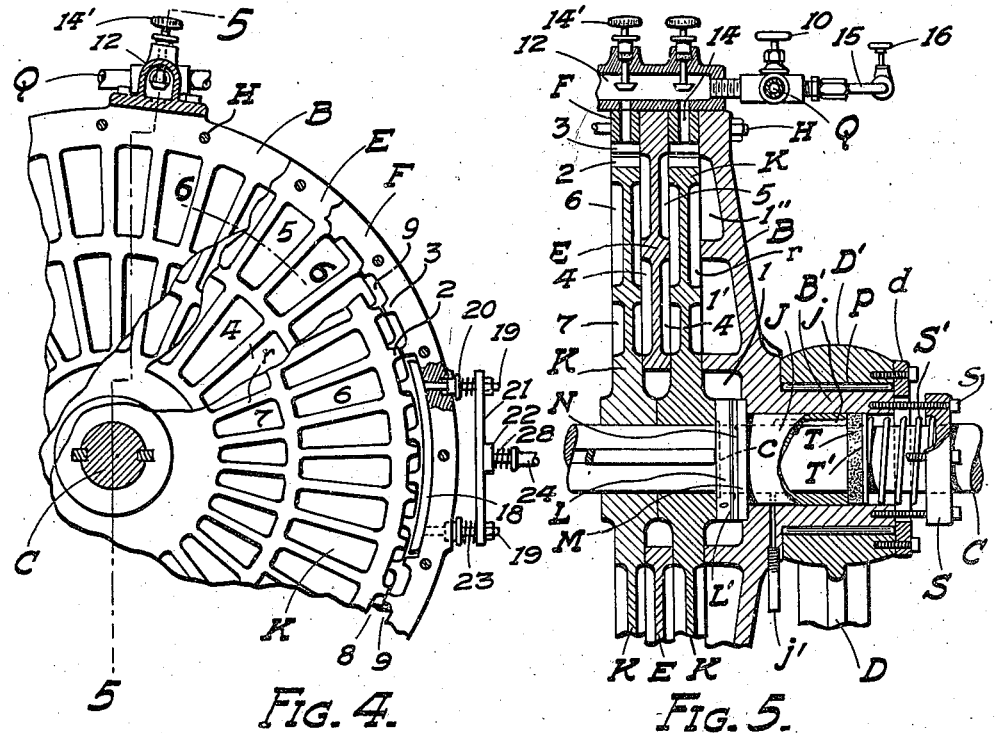
Fig. 4 is a sectional view taken on line 4—4 of Fig. 2.
Fig. 5 is a sectional view taken on line 5—5 of Fig. 4.

Referring to Fig. 1, the machine comprises generally a fluid brake A carried on a shaft C with which it tends to rotate when energy from the rotating shaft is absorbed in the brake. An arm U extends from brake A and prevents rotation thereof, the force necessary to do this being measured by a scale or weighing mechanism G forming the subject matter of my co-pending application, Serial No. 570,943, filed October 24, 1931, of which this application is a division. Brake A comprises similar heads B, mounted upon shaft C, the assembly being supported in journaling standards D. Between heads B are clamped, generally in the order shown, stator discs E Fig. 5 which are separated from each other by spacer rings F, the joints so formed by heads B, discs E, and spacer rings F, being sealed by appropriate gaskets or other well known means such as films of shellac-like products between the opposed faces of the elements, the same being drawn tightly together, by suitable bolt and nut or other means, H, to form a structurally integral unit sealed against fluid leakage at said joints. The heads B have hollow trunnions B' which are bored and preferably fitted with bushings J, in which aforesaid shaft C is journaled. The central portion of the shaft C is suitably splined or otherwise arranged to allow for substantially rigidly fixing thereon rotor discs K, the rotor discs operating substantially in the planes of the spacer rings F and being concentric therewith. The assembly A may be composed of a larger or lesser number of disc elements, the alternating relationship, however, remaining as indicated in the accompanying drawings. The position of the rotor discs, on shaft C, is preferably maintained relatively to stator disks E by spacing collars L which are arranged to approximately fill the spaces remaining between the end disks and suitable thrust elements M, the latter being conveniently formed as integral parts of the heads B. The said collars also have wearing faces L', which together with the bores of elements M are of suitable bearing material. The exact positioning of the rotor element to give the correct running clearance between the rotor and stator disks may conveniently be determined by thrust washers N disposed between the faces $L^1$ and M. The assembly C will be positively held against longitudinal movement relatively to the shaft in the present instance by a threaded collar or nut element $L^2$ engaging a thread $t$ on said shaft, the nut being prevented from loosening by a set screw $L^3$, or other well known means. The shaft C is provided with a shoulder $c$ against which the discs K are clamped by nut $L^2$, the general aspect of the shaft being shown in Fig. 10.

The outer peripheries of the trunnions B' form the inner raceways for roller-bearings P and the outer raceways for said rollers are provided by the hubs D' of the standards D, the latter being attached to any suitable base, or the purposes of the standards may be served by other adjacent structure if such is available. The rollers P are confined to their annular raceways by means of annular end, or ring-plates $d$.

The operating medium for the dynamometer unit A may be any suitable fluid supplied by an appropriate line Q, and, in a like manner, discharged through R. The fluid will find its way, between the rotor and stator elements from inlet Q to outlet R, by means of manifold elements to be later described.

The heads B and disks E and K are provided with complementary raised surfaces which approach as shown so as to provide substantially only mechanical clearance between the stationary and rotating elements, and the heads B are provided with pockets or openings I, I', and I". The rotor disks K have peripheral fins 2, Fig. 4 which are spaced from and opposed to similar fins 3 inwardly projecting from the ring spacers F. Both faces of the disks E and K are provided with recesses or openings 4, 5, and 6, 7, respectively while the aforesaid fins 2 and 3 provide opposed peripheral recesses 8 and 9. The portions of the disks remaining between the openings form lands or ribs $r$ between the openings, the lands of adjacent disks approaching each other so closely as to substantially prevent any flow of fluid between the disks except by way of the openings 5, 6, 4, 7, etc.

In the present instance there are 25 ribs of the recesses 4 opposed to 24 ribs of the recesses 7, and 50 ribs of the recesses 5, similarly opposing 49 ribs of the recesses 6, the rib-enclosed recesses of the heads B being similar to the divisions in the stator discs E. In like manner the number of ribs 2 on the periphery of the disks is different, although preferably only slightly, from the number of ribs 3 on the rings F, as clearly shown in Fig. 4, wherein the ribs 2 are shown registering with the ribs 3 immediately above the brake shoe 18, while the ribs 2 are somewhat displaced from the ribs 3 immediately below the brake shoe. This difference in the number of recesses on adjacent disks prevents registration of all the recesses of the disks with each other at one time, thus preventing the development of a different torque at these points than would occur at points of non-registration, and preventing any "ripple" in the torque opposed to a driving means under test, or vibration in the dynamometer itself. The stator openings 4 and 5, are preferably of different radial extent than the rotor openings 6 and 7, and this further reduces the tendency to vibration and facilitates the transfer of fluid from rotor to stator and back, as more fully described below.

The operation of this general type of fluid brake is well known, the fluid, more or less filling the recesses on the opposed disks, being given kinetic energy from the rotating disks, and dissipating it in the form of heat when it encounters the ribs on the stationary disks, the fluid tending to turn the stationary disks and thus generating a torque therein which is equal to that with which it opposes the rotation of the rotating disks, and which may be measured by scale G.

The journaling of the shaft C will preferably be lubricated with the fluid employed in operating the invention. From the recesses I, fluid will find its way through the bearing journals by means of grooves N' formed in the thrust washers N the fluid being transmitted as a film along the shaft to the bushings J, which latter have appropriate collector grooves $j$, a drain $j'$, leading therefrom to any convenient waste receptacle.

The bores for the bushings J will be sealed by an appropriate packing T which will have a follower ring T'. A collar S fitting loosely around the shaft C is engaged by a compression spring S' that surrounds the shaft between the collar S and the ring T' to resiliently urge the ring in a direction to compress the packing. The said collar can be taken up by suitable screws $s$ engaged in the present instance with trunnions B'. Collar S is originally set to compress the spring S' for a desired pressure, and may be again adjusted when necessary, which will be rarely. The said spring will automatically follow up the wear, or change in the packing, and unlike an ordinary screw adjusted gland will not permit the development of a fluid path through or past the packing between adjustments. The oscillating movement of the assembly A with reference to the trunnions B', is comparatively negligible in the dynamometer, so that the friction of the roller-bearings P will be a minor consideration, readily cared for by any of the simpler lubricating devices already well-known.

Figures 6, 10:
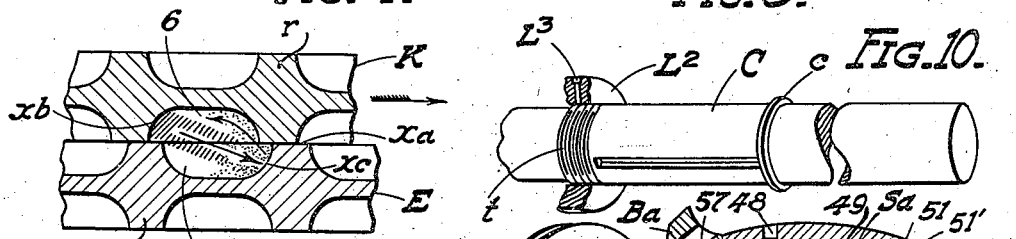
Fig. 6 is a sectional view taken on line 6—6 of Fig. 4.
Fig. 10 is a perspective view of the axial shaft here employed showing parts broken away.

Fig. 6 illustrates the theory of operation of the disclosed fluid brake. As shown in the figure the pockets 5 and 6 at the instant are in opposed relation, such that they form a cavity that is in cross section an approximation of a flattened oval. The figure indicates an action which takes place during the overlapping of the ribs at the joints Xa. A volume of fluid, indicated by plain arrows, is carried at a certain velocity by the rotor K, which is turning in the direction indicated by the feathered arrow, and by virtue of the curvature at the wall Xb in pocket 6, is thrown diagonally against the wall Xc of pocket 5, dissipating the energy of motion which it has acquired from K in its impact against the stator E, the impact developing a force tending to move the stator E in the same direction as the rotor K, the similar but reverse curvature of the wall Xc deflecting said volume back to the rotor pocket 6 where it again picks up velocity to repeat the process or cycle, for example in a succeeding pocket 5.

Various types of curves for the faces of pockets 5 and 6 would cause the action above described, and any such as may be found adaptable are contemplated as equivalent to that shown, the invention not being limited to any specific curve except as defined in the claims, the essential purpose of the curve being to promote smooth and easy movement of the above mentioned small volumes of fluid into and out of the pockets with the least possible tendency to form eddies, spray, emulsion or the like.

It is also to be noted that fluid in the openings 6 and 7 of the rotor disks will have a radial component of force due to the centrifugal effect of the rotation of the disks, while that in openings 4 and 5 of the stator disks will not. There will therefore be a flow of fluid outwardly of the openings of the rotor, this fluid being deflected laterally by the outer walls of the openings into the adjacent openings in the stator. Fluid already in the stator openings, being under no centrifugal force, is displaced backwardly toward the axis of the disks, and finally directed back into the rotor openings by the inner ends of the stator openings, the pressure in the rotor openings at this point being less than that nearer the periphery of the disk because of the shorter radius of the path of movement of this fluid. Under conditions where the openings are only partly filled, these portions of the rotor openings may be entirely empty except for the fluid being introduced from the stator openings.

Suitable fluid control valves, inlet 10 and discharge 11, Fig. 1 control the fluid on its way to and from appropriate manifolds 12 and 13 which are attached to the periphery of the unit A so as to lie in communication with ports 14 Fig. 5 in the spacer rings F registering with the spaces between stator disks E. The spacer rings F of the brake are provided with outlet ports at their lower portions corresponding to inlet ports 14. In the manifold 12 closure valves 14' are provided which may be used in certain instances where a restricting of the ports 14 may be desirable, or where, for example under light load, better graduation of resistance can be accomplished by running some compartments empty and taking the load on those remaining, certain of valves 14' then being entirely closed.

For permitting exceptionally fine graduation of the fluid supply a by-pass 15 that is controlled by a relatively smaller valve 16 is provided. The by-pass arrangement provides an economical method of obtaining an inlet means with ordinary elements which will be variable accurately over a wide range of capacities. A suitable fitting at the manifold 12 will permit of attaching an appropriate pressure gauge V and a check-valve 17, the latter serving to admit air to the assembly A when it is desired to empty it when at rest.

During operation the liquid forms a vortex within the assembly and the radial depth of the liquid of this formation may be regulated and maintained in accordance with the desired effect by suitable setting of valves 10, 11, 14', and 16. This effect is obtained by partly closing the valve 11 so as to restrict the discharge of fluid from the device and cause an accumulation of fluid in the vortex sufficient so that the pressure developed by the centrifugal action thereof will cause a discharge equal to the inflow through manifold 12. The manifold 13 will be similar to the one just described except that the valves 14' under most conditions will not be used at the fluid discharge side. The valve 17 also admits air when it is desired to reduce the liquid content of the device when in operation, the liquid discharging at manifold 13 until the internal pressure at manifold 12 due to centrifugal force becomes less than atmospheric, when the valve opens, admitting air, which mixes with the liquid and finds its way to the center of the vortex within the machine. In the outflow line R provision is arranged for a thermometer Z preferably located between the manifold 13 and discharge valve 11.

The dynamometer will operate in conjunction with a suitable scale suitably suspended independently of the dynamometer and affected by a vertical staff U', that is fixed in the present instance with above mentioned beam U, carried by the dynamometer assembly. Since this scale feature is set forth in detail in my co-pending application filed Oct. 24, 1931, Serial No. 570,943, patented February 19, 1935, Patent No. 1,991,826, the same being the original application from which this application was divided, further description of it is not given herein.

To obtain increased torque for satisfactory readings for testing at low speeds, such for example as when starting an engine test, a friction braking arrangement is provided, brake-shoes 18 being movable to frictionally contact the rotors when desired. The shoes are arranged to retract in the present instance when not in use within recesses formed in the rings F opposite their respective rotors. Each shoe has studs 19 which pass through said rings, the bores therefor being packed by means of suitable gland-nuts or the like 20. The rods are united for simultaneous actuation by plates 21 which in turn are transversely united by a crosshead 22 common to the several brake sets, and plates 21. Brake releasing springs 23 operate between nuts 23 and plates 21. The brake-sets are adjusted as a single assembly by means of a threaded rod 24 or the like, the manipulation of which through a hand-wheel 25 advances or withdraws said rod through a tapped bore provided for same in the present instance in a counterweight block 26, which is in turn adjustably cradled between arms 27 that extend from the assembly A. The said rod 24 passes freely through the transverse bar 22, and a cushioning spring 28 envelopes said rod between the bar and a collar fixed on said rod, movement of the rod accordingly compressing spring 28, and urging crosshead 22 in a direction to apply the brake. This arrangement tends to eliminate chatter or vibration when the brake is applied. The brake assembly may be withdrawn from rotor contact at any time by manipulation of hand wheel 25, as for example when the unit under test is operating at high speed when the friction brake will not be required.

The mounting of said counterweight is by means of a supporting bar 29 provided with terminal flats 29' which are slidable in slots formed in the arms 27 and adjustable therein with suitable bolts 30. The bar 29 is centrally apertured to allow free passage therethrough of the aforesaid threaded rod. The counterweight is held against shifting by a set-screw 31 which engages a flat spot on the bar 29. It is understood that other counterweight means are contemplated as within the scope of the invention.

Figures 11, 13:
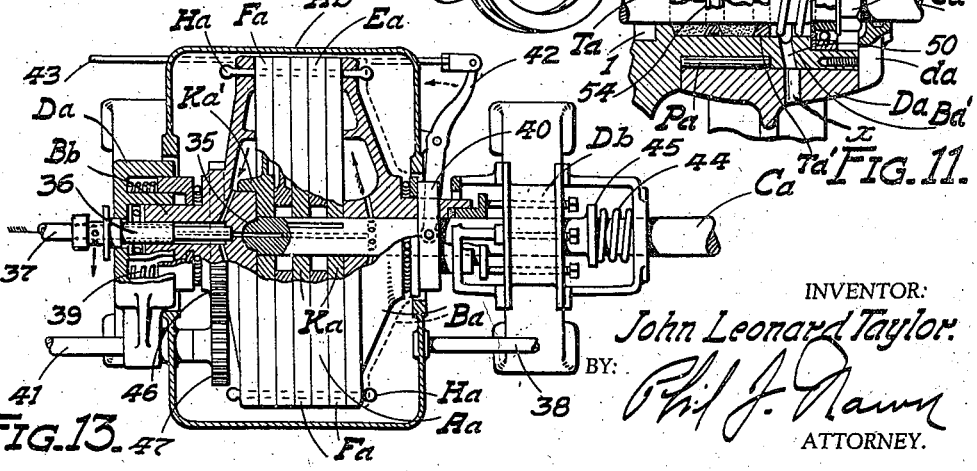
Fig. 11 is a vertical axial section of a modified bearing arrangement.
Fig. 13 is a plan view, partly in section, of a hydraulic transmission modification involving principles of the invention.

The modification disclosed in Fig. 11 will employ rollers Pa of shorter lengths, disposed as are the similar but longer forms, above set forth, with respect to their hub Da and trunnion Ba', where a suitable annular reduction of the trunnion's diameter will provide an enclosing raceway, which will be lubricated through the bore 48. Fluid, and spent lubricating material will find their way along the shaft to an annular groove 49 which communicates with a passage 50 that leads to an outlet x, the latter being oversize to preserve registry throughout the limited movement of the trunnions. The trunnion Ba' is further counterbored to admit an anti-friction bearing 51. Axially of the bearing 51 is placed a washer 51' which is held in place by the outer race of the bearing, the washer being relieved to clear the inner race. This washer is a thrust-plate for holding a spring Sa free of said inner race. The shaft Ca is threaded beyond said bearing to accommodate a nut 52 that in turn is locked in place by a lock washer 53 or other well known means.

The shaft Ca is suitably packed by appropriate sealing material Ta which is divided in the present instance by an oil-ring 54, the latter having an annular groove 55, Fig. 12 from which extend ports 56 through which lubricant from a container inserted at 57 will find its way to the shaft. The said packing is provided with a follower-ring Ta', held against the packing by the spring Sa confined between said packing and the aforesaid ring 51'. The assembly just described, is sealed against outside conditions by a cap da having a seal of simple design da'. The volume of fluid discharging at x will indicate the effectiveness of the packing Ta, which may be further compressed by inserting a washer in the bore behind the spring Sa or by installing additional packing.

The trunnion bearing disclosed in Figs. 11 and 12 is appropriate for high-speed operation where frictional heat might be excessive in the bushing structure above disclosed, the latter being, of course, a more economical arrangement.

In Fig. 13 is shown a modification wherein the elements above disclosed are adapted to a form of hydraulic power-transmission. The structure of said modification is intentionally schematic, but practical in its general arrangement.

The assembly Aa is inclosed in a stationary housing Ab within which it rotates by virtue of the exterior and aligned bearings Da and Db. The power, or driving, shaft Ca terminates in a suitable pilot bearing 35. A trunnion Bb, extends from a head Ba, the said trunnion being axially bored to receive suitable tube members, 36—37, arranged in sleeved relationship to rotate with the trunnion Bb. The outer tube 36 will be appropriately sealed against leakage at the bearing Da, and again between itself and the inner tube 37. The tube 37 will terminate with a fluid-tight flexible union, not shown here, but of well known or suitable type. The shaft Ca is bored in registry with the said tube 37, the bores branching off to provide fluid inlet and outlet means in assembly Aa, indicated by the respective feathered and plain arrows in Fig. 13. The disc and ring elements, here designated as Ea, Fa and Ka, correspond in general to the discs E, F, and K, described above. The assembly Aa is held together by the axial means shown, and by rods Ha circumferentially disposed and slidable in aligned apertures in elements Ba, Ea, and Fa whereby to permit axial relative movement of the parts while preventing relative rotation or other undesired movement thereof.

The abutting relationship of the members Ea and Fa is not fixed as in the dynamometer, but the members are accurately formed to abut in a fluid sealing relation, while being free to part at their joints for allowing the escape of fluid about the periphery, the discharged fluid finding its way to a lower part of the housing Ab to be returned, by means of a drain 38, to any convenient storage reservoir. The assembly Aa is normally held in its compacted relation by the co-action of a spring 39 and a ring 40, the latter being connected to any appropriate controlling means which might conveniently take the form of a governor responsive to a power take-off shaft 41, the latter being connected with mechanism actuated by the said assembly. The said governor means might for example function to modify the rotative force applied through the assembly to shaft 41 in consonance with the working resistance met by the said mechanism. Ring 40 is actuated by a fork 42, fulcrumed to the housing Ab, and a suitable rod 43 which latter would lead to the control or governor.

The dotted position indicates the maximum contemplated separation of the elements comprising the assembly Aa. The movements of rod 43 will cause a variable separation between the disc elements, which will vary the clearance between the driving and driven elements and accordingly change the amount of torque developed in the driven elements. The rotors Ka must be slidably keyed to the shaft Ca, to permit the separation of the elements disclosed above, and in one instance the adjacent disc Ka' will be flanged about an interior boss on the head Ba to preserve alignment of the outer members with trunnion Ba.

Obviously maximum movement of the elements toward each other will result in actual frictional contact therebetween after which a direct, or substantially positive drive may be transmitted through the device from shaft Ca to shaft 41. The said shaft is urged in a direction to preserve a leak-tight joint at its abutment 35 by means of a spring 44 opposed to a shoulder 45 axially fixed with shaft Ca. Rotation of the driven elements is transmitted to shaft 41 through a gear 46, fixed with the head Ba, the gear meshing with a similar gear 47 fixed to the power take-off shaft 41.

It is to be noted that while fluid brakes of the general type disclosed herein operate to develop substantial torque when operating at relatively high speeds, the torque developed at low speeds is relatively slight, and it is often difficult under these conditions to get an accurate reading of the value thereof, and also to develop sufficient resistance to the movement of the unit being tested to cause it to develop its maximum power at such speeds. The addition of the brake shoes 18 arranged to contact the rotors K provides a convenient means for causing such increased resistance as is necessary under these conditions. A peculiar advantage of the construction used resides in the fact that the brake shoes are effectively cooled by the fluid normally present in the stator, and no further provision is necessary for cooling the shoes even in the event of long runs at low speed.

A further advantage of the arrangement arises from the combination of the two types of braking resistance in the one device. Thus it is possible to develop a fixed resistance, for example at low speed, with the friction shoes, and then to vary the total resistance in extremely attenuated increments by merely admitting more or less fluid to the stator chambers, the cooling effect remaining substantially constant due to the fact that under any conditions such as will result in a fluid resistance to rotation, the amount of fluid present in the chambers will be greatly in excess of the amount needed to cool the shoes.

In the modification shown in Fig. 13 the effect of the friction brake is obtained by utilizing the actual frictional contact between the rotor and stator elements themselves.

The above being a complete description of illustrative embodiments of the invention, what is claimed as new and desired to be secured by Letters Patent of the United States is:—

1. In a dynamometer the combination of a stator element and a rotor element arranged to be connected with a power source to be tested, a plurality of fluid pockets on said stator and a plurality of fluid pockets on said rotor, fluid supply means arranged to introduce fluid between said elements whereby to provide a fluid resistance to rotation of said rotor, and a friction brake carried by said stator element, and manually controlled means for moving said brake when desired into frictional contact with the other element.

2. In a dynamometer the combination of a stator element and a rotor element arranged to be connected with a power source to be tested, a plurality of fluid pockets on said stator arranged in a circumferential series, and a plurality of fluid pockets on said rotor arranged in a similar series, and disposed to open into the pockets on said stator, there being an odd number of pockets on one of said elements and an even number on the other element to prevent the simultaneous registering of all the pockets of one element with all the pockets of the other element.

3. In a dynamometer the combination of a stator element including a disk having a plurality of annular series of fluid pockets on a face thereof, a rotor arranged to be connected with a power source to be tested, and including a disk rotatably arranged in proximity to the above mentioned stator disk, and having a plurality of annular series of fluid pockets on a face thereof and positioned to open into the fluid pockets on said stator disk, the annular series on said rotor disk being of different diameters than the series on said stator disk to prevent complete registration of the pockets of one disk with those of the other.

4. In a dynamometer a stator including a pair of end plates, and a plurality of disks having fluid receiving pockets therein, a plurality of spacing rings disposed between said end plates and adjacent disks, and between adjacent disks, and collectively forming an outer shell for said stator, means for rigidly uniting said end plates, said disks and said rings, and a brake shoe carried by one of said rings and movable into contact with a rotor element disposed within said ring, and means exteriorly of said shell for so moving said shoe.

5. In a fluid actuated force controlling device the combination of a stator including a pair of end plates and a plurality of disks having fluid receiving pockets therein, a plurality of spacing rings disposed between said end plates and adjacent disks, and between adjacent disks, and collectively forming an outer shell for said stator, a rotor including a shaft, a plurality of disks on said shaft and interspersed between the disks of said stator, means fixing said disks non-rotatively but axially movably on said shaft, means preventing rotative relative movement between the disks and end plates of said stator, but permitting axial relative movement therebetween means for introducing a fluid between the several disks, and means for axially compressing the disks of said rotor and said stator, and regulating the escape of fluid between said rings and the disks of said stator.

6. In a dynamometer the combination of a stator having a plurality of chambers therein, a rotor element in each chamber, and means for supplying fluid to said chambers including a manifold positioned to communicate with all said chambers, a fluid passage and a plurality of valve elements associated with said manifold, each valve element being positioned and arranged to control the flow of fluid into one of said chambers.

7. In a dynamometer the combination of a rotor and a stator arranged to provide fluid spaces therebetween, and means for supplying fluid thereto including a fluid supply pipe, and a valve arranged to control the flow of fluid into said spaces, and a bypass connected about said valve and provided with a smaller valve to permit regulation of the flow of fluid into said spaces in extremely small increments.

8. In a dynamometer having a stator and a rotor cooperating therewith, the combination of a trunnion fixed with said stator, a bearing for supporting said trunnion, and in which said trunnion is journaled for oscillating movement, a shaft for said rotor, said trunnion having an axial bore into which said shaft extends, bearing means in said bore in which said shaft is supported for rotation, and packing material disposed about said shaft to prevent the escape of fluid about said shaft and through said trunnion, and a resilient element supported from said trunnion and arranged to yieldingly and continuously compress said packing material about said shaft.

9. In a dynamometer having a stator and a rotor cooperating therewith, a trunnion fixed with said stator, a bearing for supporting said trunnion, and in which said trunnion is journaled for oscillating movement, a shaft for said rotor, said trunnion having an axial bore into which said shaft extends, bearing means in said bore in which said shaft is supported for rotation, a plurality of packing rings disposed about said shaft in serial relation within said bore, a lubricant distributing ring disposed about said shaft between adjacent packing rings, said trunnion and said ring having intercommunicating passages through which lubricant may be introduced to said shaft, and said trunnion having a drain passage leading out of said bore between said packing rings and said bearing means, and a resilient element arranged to continuously and yieldingly compress said packing rings about said shaft.

10. In a dynamometer the combination of a stator having a fluid chamber therein, and a rotor including a disk rotatively mounted in said chamber, said disk and said chamber being provided with fluid engaging elements including a plurality of pockets on said disk, means for maintaining a body of fluid in said chamber to resist rotation of said disk therein by engagement with said pockets, and a brake shoe movable to frictionally engage said disk in position to bridge said pockets whereby fluid in said pockets is carried into contact with the wearing face of said shoe.

11. In a dynamometer the combination of a stator element and a rotor disk within the stator element and arranged to be connected to a power source to be tested, a plurality of fluid pockets on the periphery of said disk, a plurality of fluid pockets on a side of said disk arranged in a circumferential series, the number of pockets on said side being different from the number on said periphery, a plurality of fluid pockets in said stator disposed to open into the pockets on the periphery of said disk, and a plurality of fluid pockets in said stator disposed to cooperate with the pockets on the side of said disk, the number of pockets in said stator being different in each case from the number of pockets on said disk with which the stator pockets cooperate.

12. In a dynamometer the combination of a dynamometer shaft, means for applying a fluid resistance to rotation of said shaft including a fluid holding casing and a rotor within said casing, and means within said casing exposed to the cooling action of the fluid in said casing for applying a frictional resistance to rotation of said shaft whereby said means may be used either separately or together according to the type of resistance desired.

13. In a dynamometer the combination of a dynamometer shaft, means for applying a fluid resistance to rotation of said shaft including a casing and a rotor within said casing, and means within said casing for applying a frictional resistance to rotation of said shaft whereby said means may be used either separately or together, said means being arranged to furnish substantially equal resistance to rotation of said shaft in either direction.

14. In a dynamometer having a stator and a rotor cooperating therewith, the combination of a trunnion fixed with said stator, a bearing for supporting said trunnion, and in which said trunnion is journaled for oscillating movement, a shaft for said rotor, said trunnion having an axial bore into which said shaft extends, a bushing in said bore having a bore in which said shaft is journaled, and having duct means through which fluid from said stator may enter said bushing for lubricating purposes, and packing material disposed about said shaft outwardly of said bushing to prevent the escape of fluid about said shaft and through said trunnion, and a resilient element supported from said trunnion and arranged to yieldingly and continuously compress said packing material about said shaft.

15. In a dynamometer the combination of a stator having a fluid chamber therein, and a rotor member including a disk rotatively mounted in said chamber, said disk and said chamber being provided with fluid engaging elements, means for maintaining a body of fluid in said chamber to resist rotation of said disk therein by engagement with said elements, and a brake shoe member movable to frictionally engage said rotor member, one of said members being provided with pockets positioned to receive fluid from said chamber whereby fluid in said pockets is carried into contact with the wearing face of the other member.

16. In a dynamometer the combination of a stator having a fluid chamber therein, and a rotor including a disk rotatively mounted in said chamber, said disk having a series of fluid pockets on the periphery thereof, and being also provided with a series of fluid pockets on a side thereof, and said stator providing a series of fluid pockets arranged to open into the pockets on said periphery, and another series of pockets arranged to open into the pockets on said side, the number of pockets on said rotor, however, being slightly different from the number in said stator whereby to prevent the simultaneous opening into each other of any substantial number of pockets of said rotor and stator.

17. A fluid brake having a stator element and a rotor element arranged for relative rotation, one of said elements providing a plurality of openings, and the other element providing a plurality of axially directed and peripherally opposed surfaces approaching relatively closely to the other element during such movement, said surfaces defining openings therebetween communicating with the openings of the other element as said movement progresses, said openings being bounded by walls curving from spaced points in a plane substantially normal to the axis of said element to positions in planes substantially parallel to the axis of said element.

18. A fluid brake having a stator element and a rotor element arranged for relative rotation, and each providing a plurality of complementary surfaces, the surfaces of one element approaching very closely to those of the other element during rotation so as to provide only necessary mechanical clearance therebetween, and said elements providing a plurality of axially directed and peripherally opposed surfaces defining openings in said elements, the openings of one element communicating with the openings of the other element as rotation occurs, said openings being bounded by walls curving from spaced points in a plane substantially normal to the axes of said elements to positions in planes substantially parallel to the axes of said elements, whereby to provide an easement for fluid from the openings of one element to the openings of the other element to avoid undue turbulence in a body of fluid between said elements.

19. In a dynamometer the combination of a stator element and a rotor element arranged to be connected with a power source to be tested, a plurality of substantially symmetrical fluid openings on said stator, and a plurality of substantially symmetrical fluid openings on said rotor arranged so as to communicate with the openings on said stator as said rotor rotates, means for maintaining a body of fluid between said rotor and stator to engage said openings and resist rotation of said rotor, and a friction brake element in said stator and arranged to engage said rotor and to offer equal resistance to rotation thereof regardless of the direction of rotation of said rotor, the symmetrical shape of said pockets causing equal fluid resistance to rotation upon rotation of said rotor in either direction.

20. In a dynamometer the combination of alternate stator and rotor disks, and spacing means providing rotor chambers between said disks, said chambers providing fluid ports communicating therewith, and a fluid manifold communicating with said fluid ports, and valve means controlling the several ports and including closure elements individual to the respective ports.

21. In a dynamometer the combination of a stator comprising a series of alternate stator disks and means providing rotor chambers between said disks, each of said chambers providing a peripheral inlet port and an outlet port peripherally spaced from said inlet port, a peripheral inlet conduit communicating with the several inlet ports, an outlet conduit communicating with the several outlet ports, and means arranged to provide communication from the exterior of said stator for venting said stator.

22. In a dynamometer a stator structure comprising a pair of end plates and a series of alternate stator disks and spacing rings said rings being arranged to space said end plates and stator disks providing rotor chambers therebetween, and to form an outer stress bearing shell for said stator, each of said chambers providing a fluid port therein, and a fluid conduit communicating with the several ports.

23. In a dynamometer the combination of a stator providing a plurality of rotor chambers, and a plurality of fluid manifolds communicating respectively at spaced points with the periphery of each rotor chamber.

24. In a dynamometer the combination of a stator comprising a series of alternate stator disks and means providing rotor chambers between said disks, each of said chambers providing a peripheral inlet port, and a peripheral outlet port spaced from said inlet port, and an inlet conduit communicating with the several inlet ports, and an outlet conduit communicating with the several outlet ports.

25. In a dynamometer the combination of a stator disk and a rotor disk arranged to be connected with a power source to be tested and having a face portion arranged to rotate in proximity to a face portion of said stator, the face of one of said elements being formed to provide a series of distributed openings, and the face of the other element being formed to provide a similar series of openings the openings of one element being positioned to communicate with those of the other during such rotation, but some of said openings being substantially radially offset therefrom to prevent registration of the openings of one element with those of the other.

26. In a dynamometer the combination of a stator disk and a rotor disk arranged to be connected with a power source to be tested, and having a face portion arranged to rotate in proximity to a face portion of said stator, said portions of said rotor and stator providing distributed openings communicating with each other during the course of rotation of said rotor, the openings of one element overlapping those of the other element so as to provide a tortuous path, partly in said rotor and partly in said stator, through which alone, fluid may flow.

27. In a dynamometer a series of alternate stator and rotor disks, said rotor disks being arranged to be coupled to a power source to be tested, said rotor and stator disks having complementary surfaces disposed for relative movement with substantially only mechanical clearance during rotation of said rotor, said rotor disks providing a distributed series of openings in said surfaces, and said stator disks also providing a series of distributed openings, the openings in said complementary surfaces overlapping and providing paths in said stator disks for displacement toward the axis of said rotor of fluid in the openings of said stator disks, when displaced by fluid from the openings of said rotor disks urged from the rotor openings to the stator openings by centrifugal force developed by rotation of said rotor.

28. In a dynamometer a series of alternate stator and rotor disks, said rotor disks being arranged to be coupled to a power source to be tested, said rotor and stator disks having complementary surfaces disposed for relative movement in close proximity during rotation of said rotor, said rotor disks providing a series of openings distributed in said surfaces and said stator disks also providing a series of distributed openings, the openings in said complementary surfaces overlapping and providing paths in said stator disks for displacement of fluid in the openings in said stator disks toward the axis of said rotor when displaced by centrifugally urged fluid from said rotor, and the openings in said stator disks being so formed as to direct fluid so displaced back into the openings in said rotor upon predetermined movement toward said axis.

29. In a dynamometer a stator and a rotor element, said rotor element arranged to be driven from a power source to be tested, and said elements having complementary surfaces disposed for relative movement in close proximity during rotation of said rotor element, said rotor providing a series of openings distributed in said surface and said stator also providing a series of distributed openings, the openings in said complementary surfaces overlapping and providing paths in said stator element for displacement of fluid in the openings in said stator toward the axis of said rotor when displaced by centrifugally urged fluid from said rotor, and the openings in said stator being so formed as to direct fluid so displaced back into the openings in said rotor upon predetermined movement toward said axis.

JOHN LEONARD TAYLOR.